May 26, 1959 C. K. MOUSEL 2,888,130
MATERIAL HANDLING APPARATUS
Filed July 24, 1957 2 Sheets-Sheet 2
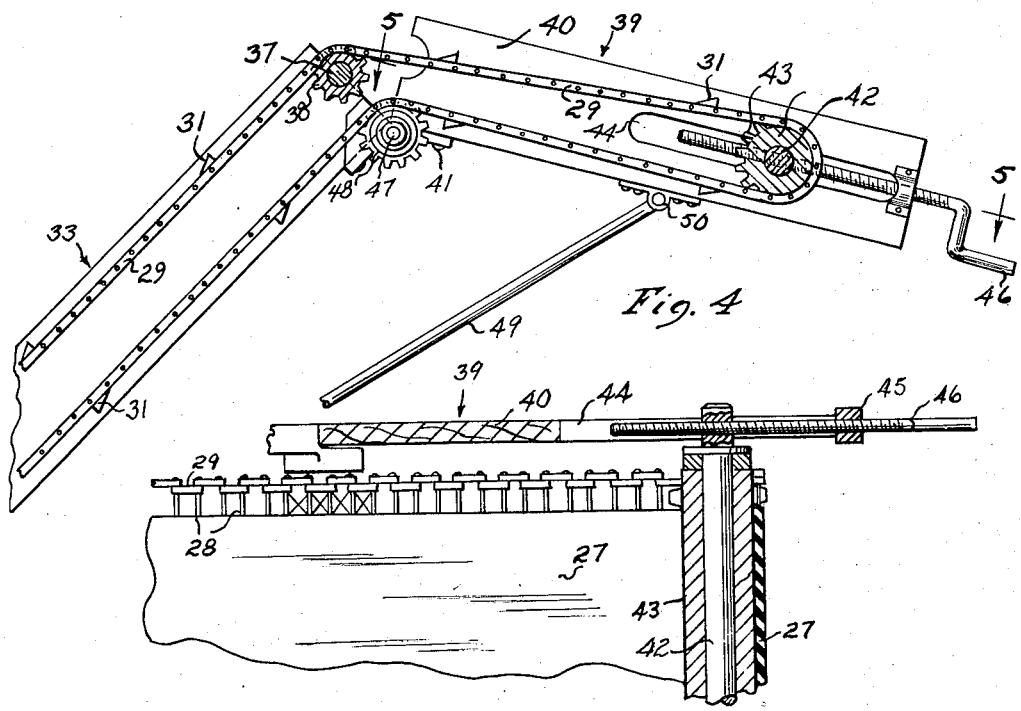
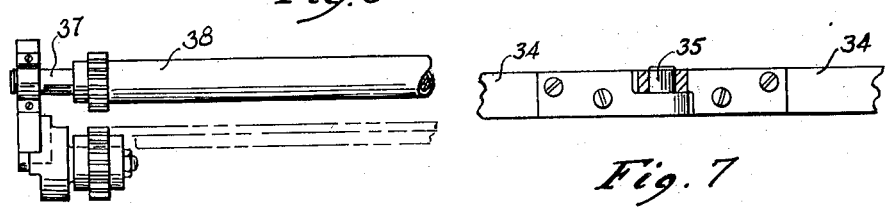
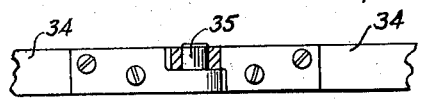
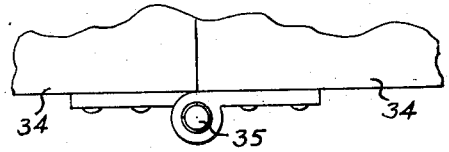
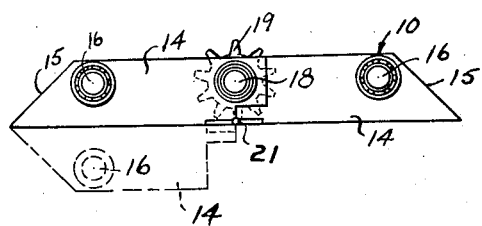
INVENTOR.
Canellen K. Mousel
BY Victor J. Evans & Co.
ATTORNEYS

United States Patent Office 2,888,130
Patented May 26, 1959

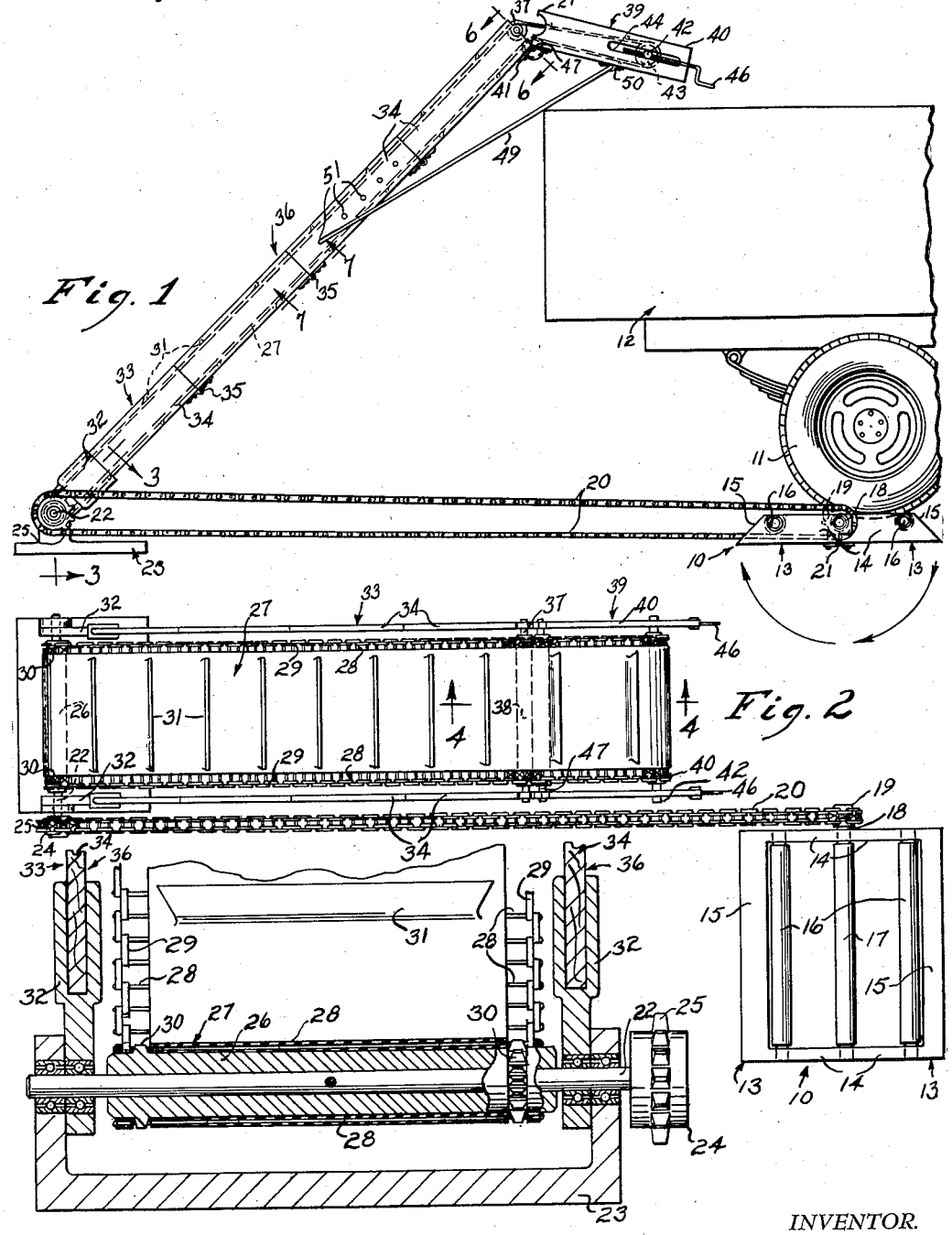

2,888,130

MATERIAL HANDLING APPARATUS

Canellen K. Mousel, Edison, Nebr.

Application July 24, 1957, Serial No. 673,952

5 Claims. (Cl. 198—109)

This invention relates to an apparatus for handling materials, such as hay or the like.

The object of the invention is to provide a material handling apparatus which is constructed so that various materials, such as hay, grain or the like can be readily loaded or unloaded from vehicles or other equipment.

A further object of the invention is to provide a material handling apparatus which includes a means whereby a vehicle can be arranged so that the rear wheels thereof provide the motive force for operating the conveyor, so that various materials such as materials around a farm can be readily loaded or unloaded from different receptacles, vehicles, or the like.

Another object of the invention is to provide a material handling apparatus which includes a conveyor as well as a drive means, and wherein when the apparatus is not being used, it can be readily folded so that it will occupy a minimum amount of space for storage or shipment.

A further object of the invention is to provide a material handling apparatus which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view showing the material handling apparatus of the present invention being used.

Figure 2 is a top plan view of the apparatus of the present invention.

Figure 3 is a sectional view taken on the line 3—3 of Figure 1.

Figure 4 is a sectional view taken on the line 4—4 of Figure 2.

Figure 5 is a sectional view taken on the line 5—5 of Figure 4.

Figure 6 is a sectional view taken on the line 6—6 of Figure 1.

Figure 7 is a sectional view taken on the line 7—7 of Figure 1.

Figure 8 is a view similar to Figure 7 but taken at right angles thereto.

Figure 9 is a side elevational view illustrating the foldable base on which the rear wheels of the truck or other vehicle are adapted to be arranged for furnishing the motive force.

Referring in detail to the drawings, the numeral 10 indicates a base which is adapted to have the rear wheels 11 of a conventional vehicle such as a truck 12 arranged in engagement therewith as shown in Figure 1. The base 10 includes a pair of sections 13 which are hingedly connected together by means of hinges 21, and each of the sections 13 includes a pair of spaced parallel side pieces 14 and an end piece 15. The end pieces 15 are inclined as shown in Figure 1 for example so as to facilitate the movement of the truck wheels 11 onto the base. Supported by the base 10 and journaled therein is a plurality of rollers 16 and 17. The roller 17 has a shaft 18 extending therefrom, and a sprocket 19 is mounted on an end of the drive shaft 18. An endless chain 20 is trained over the sprocket 19, so that by actuating the truck 12, the rear wheel 11 can be rotated and this will cause rotation of the roller 17 which in turn will cause movement of the chain 20 so that motive force or power for operating the material handling apparatus of the present invention can be conveniently furnished.

Spaced from the base 10 is a support member 23, and supported by the support member 23 is a first shaft 22 which has a body member 24 on an end thereof. Sprocket teeth 25 are arranged on the body member 24, and the endless chain 20 engages the sprocket teeth 25. A roller 26 is mounted on the first shaft 22, and the roller 26 is secured to the shaft 22 in any suitable manner, Figure 3.

Trained over the roller 26 is an endless belt 27, and the belt 27 may be provided with a plurality of spaced apart tie-rods or elongated wire elements 28, and the ends of the wire elements 28 extend outwardly and engage a pair of spaced parallel endless chains 29, the chains 29 being arranged in engagement with sprocket teeth 30 which may be formed integral with the rollers such as the roller 26. A plurality of spaced parallel carrying elements 31 are secured to the belt 27 so that with the device operating, hay, grain or the like can be readily moved in the proper direction by means of the carrying elements 31.

Extending upwardly from the support member 23 and pivotally connected thereto, is a pair of spaced parallel arms 32, Figure 3. A frame 33 is provided, and the frame 33 includes a pair of spaced parallel side members 36. Each of the side members 36 includes a plurality of rectangular sections 34 which are hingedly connected together by means of hinges 35, Figure 1. The lowermost of the sections 34 is adapted to be secured to the arms 32, as for example as shown in Figure 3. Since the hinges 35 are located on the lower portions of the sections 34, it will be seen that the sections 34 can only pivot or swing open about an axis extending through the hinges 35. Furthermore, the inner edges of the sections 34 abut each other when the parts are in the position of Figure 1 so that accidental collapsing of the device is prevented. However, the various sections can be pivoted on the hinges 35 when the device is not being used. In the final folded position, the adjacent sections are arranged contiguous to each other so that the device will occupy a minimum amount of space.

Journaled in the upper end of the frame 33 is a second shaft 37 which has a roller 38 thereon, Figure 4, and the roller 38 may also have sprocket teeth which are similar to the sprocket teeth 30. The chains 29 are adapted to engage the teeth on the roller 38.

The material handling apparatus of the present invention further includes an extension which is indicated generally by the numeral 39, Figure 4, and the extension 39 is hingedly connected to the frame 33 by means of hinges 41, the extension 39 including a pair of spaced parallel side plates 40.

The numeral 42 indicates a third shaft which has its end portions projecting through slots 44 in the side plates 40, and a roller 43 is mounted on the third shaft 42, the roller 43 being provided with sprocket teeth which are adapted to be engaged by the endless chains 29. Bearings 45 are carried by the side plates 40, and manually operable cranks 46 extend through the bearings 45 and into engagement with the shaft 42 so that by manually turning the cranks 46, the position of the shaft 42 can be changed whereby tension on the chains 29 can be changed or regulated as desired.

There is further provided a fourth shaft 47 which is arranged as shown in Figure 4, and the fourth shaft 47 has a roller 48 thereon, and the roller 48 is provided with sprocket teeth which are engaged by the chains 29.

A means is provided for maintaining the extension 39 immobile in its various adjusted positions, and this means comprises braces 49 which each have an end connected to the extension 39 as at 50. The braces 49 may be provided with transverse portions on the other end thereof, and these transverse portions are adapted to engage spaced apart openings 51 which are arranged in the frame 33, Figure 1. Thus, by arranging the lower ends of the braces 49 in engagement with different of the openings 51, the extension 39 can be supported in different angular positions, as for example when grain or other material is being loaded or unloaded from different areas or receptacles.

From the foregoing, it is apparent that there has been provided a material handling apparatus, and in use with the parts arranged as shown in Figure 1 for example, it will be seen that the rear wheel 11 of the truck 12 can be arranged on the base 10. The inclined end pieces 15 permit the truck wheel 11 to be readily moved into engagement with the base 10, and the rollers 16 are idler rollers, while the roller 17 is a drive roller. As the vehicle engine is operated, the rear wheel 11 will be turned and this will rotate the roller 17 which in turn will turn the shaft 18. This turning movement of the shaft 18 will cause movement of the chain 20 since the chain 20 engages the sprocket 19 on the shaft 18. The chain 20 also engages the sprocket 25 on the shaft 22 so that movement of the chain 20 will result in movement of the first shaft 22. The roller 26 is secured to the shaft 22, and the roller 26 has teeth such as the teeth 30 thereon so that as the shaft 22 rotates, the roller 26 also rotates and this causes movement of the chains 29 which engage the teeth 30. The endless belt 27 is trained around the roller 26, and the belt 27 includes the tie-rods or wire elements 28 which are connected to the chains 29 so that a positive drive of the belt 27 is provided. The belt 27 carries a plurality of spaced apart carrying elements 31 whereby various materials such as hay, grain or the like can be readily elevated or loaded into a suitable vehicle, receptacle or the like. By reversing the direction of rotation of the wheel 11, the apparatus can be used for unloading materials from a receptacle, vehicle or the like.

The chains 29 are also trained over sprocket teeth on the roller 38, roller 43, and roller 48. The tension of the chains 29 can be increased or changed by manually rotating the cranks 46. The extension 39 can be moved to different angular positions with respect to the frame 33, and the braces 49 serve to maintain the extension 39 immobile in its various adjusted positions. The frame 33 includes the side members 36 which each embodies a plurality of sections 34 that are hingedly connected together as at 35. Also, the base 10 includes the sections 13 which are hingedly connected together as at 21. Thus, when the apparatus is not being used, it can be readily folded or moved to a collapsed position so that it will occupy a minimum amount of space for storage or shipment.

As previously stated, the roller 17 can be caused to rotate in either direction, depending upon whether the truck wheel 11 is rotated in a forward or reverse direction so that feed, grain or the like can either be loaded or unloaded. When the device is not being used, the parts can be readily folded and placed in the cab of a truck for example. Also, the elevator or apparatus can be quickly and easily assembled and it will be ready to operate with a minimum amount of effort. The apparatus may be used with or without the extension 39. Instead of using chains, belts may be used as the drive mechanism and the apparatus can be used for handling any desired type of material, and extra length may be added whereby the effective height of the device can be varied or increased as desired. Also, instead of using hingedly mounted sections such as the sections 34, telescoping sections may be used. The elements 31 prevent the grain, hay or the like from accidentally slipping off of the moving belt 27 and when the device is being used, the truck 12 may be put in low gear and operated. Thus, it will be seen that there has been provided an elevator which can be folded when it is not being used, and the elevator can be used for loading or unloading any type of material from different types of vehicles, receptacles or the like. The device can be carried along with the truck to the place where it is to be used, and by means of the base 10, it is not necessary to have a separate drive motor to operate the device. The parts can be made of any suitable material and in different shapes or sizes. The parts can be made of light weight material so that it is readily portable and can be conveniently carried from place to place as desired, and the apparatus is especially suitable for use on farms or the like. Different types of mechanisms such as shafts and gears can be used for operating the device instead of the chains, and provision may be made for connecting the apparatus to a power take-off shaft of a suitable engine or vehicle.

I claim:

1. In a material handling apparatus, a base including a pair of sections hingedly connected together, said sections each including a pair of spaced parallel side pieces and an inclined end piece, a plurality of rollers journaled in said base, a support member spaced from said base, a first shaft supported by said support member, means connecting one of said rollers to said first shaft, said means comprising chain and sprockets, a roller mounted on said first shaft and connected thereto, a pair of spaced parallel arms pivotally connected to said support member, a frame including a pair of spaced parallel side members extending from said arms, each of said side members including a plurality of rectangular sections hingedly connected together, a second shaft journaled between the upper ends of said side members and having a roller thereon, an extension hingedly connected to the upper end of said frame and including a pair of spaced parallel side plates, there being opposed slots in said side plates, a third shaft having its ends projecting through said slots, and said third shaft having a roller thereon, bearings on said side plates, manually operable cranks arranged in engagement with said bearings and connected to said third shaft, braces having one end connected to said extensions, there being a plurality of spaced apart openings in said frame for selectively receiving the other ends of said braces, a fourth shaft arranged below said second shaft and having a roller thereon, an endless belt trained over the rollers on said first, second, third and fourth shafts, a plurality of spaced parallel carrying elements connected to said belt, sprocket teeth on the rollers on said shafts, chains engaging said sprocket teeth, and a plurality of tie-rods extending from said belt and arranged in engagement with said last named chains.

2. In a material handling apparatus, a base including a pair of sections hingedly connected together, said sections each including an inclined end piece, a plurality of rollers journaled in said base, a support member spaced from said base, a first shaft supported by said support member, means connecting one of said rollers to said first shaft, a roller mounted on said first shaft and connected thereto, a pair of spaced parallel arms pivotally connected to said support member, a frame including a pair of spaced parallel side members extending from said arms, a second shaft journaled between the upper ends of said side members and having a roller thereon, an extension hingedly connected to the upper end of said frame, a third shaft carried by said extension and said third shaft having a roller thereon, a fourth shaft arranged below said second shaft and having a roller thereon, an endless belt trained over the rollers on said first, second, third and fourth shafts, a plurality of carrying elements connected to said belt, sprocket teeth on the rollers on said shafts, chains engaging said sprocket teeth, and a plurality of tie-rods extending from said belt and into engagement with said chains.

3. The structure as defined in claim 2, and further including manually operable cranks engaging said third shaft.

4. The structure as defined in claim 2, wherein each of the side members include a plurality of rectangular sections hingedly connected together.

5. In a material handling apparatus, a base including a pair of sections hingedly connected together, said sections each including an inclined end piece, a plurality of rollers journaled in said base, a support member spaced from said base, a first shaft supported by said support member, means connecting one of said rollers to said first shaft, a roller mounted on said first shaft and connected thereto, a pair of spaced parallel arms pivotally connected to said support member, a frame including a pair of spaced parallel side members extending from said arms, a second shaft journaled between the upper ends of said side members and having a roller thereon, an extension hingedly connected to the upper end of said frame, a third shaft carried by said extension and said third shaft having a roller thereon, a fourth shaft arranged below said second shaft and having a roller thereon, an endless belt trained over the rollers on said first, second, third and fourth shafts, a plurality of carrying elements connected to said belt, sprocket teeth on the rollers on said shafts, chains engaging said sprocket teeth, and a plurality of tie-rods extending from said belt and into engagement with said chains, each of said side members including a plurality of rectangular sections hingedly connected together, manually operable cranks connected to said third shaft, and braces having one end connected to said extension, there being a plurality of spaced apart openings in said frame for selective engagement by the other ends of said braces.

References Cited in the file of this patent

UNITED STATES PATENTS

| | | |
|---|---|---|
| 1,075,196 | Cottew | Oct. 7, 1913 |
| 1,275,450 | Leprevost | Aug. 13, 1918 |
| 1,780,307 | McLennan | Nov. 4, 1930 |
| 2,267,419 | Oster | Dec. 23, 1941 |
| 2,368,414 | Eggleston | Jan. 30, 1945 |
| 2,401,633 | Gribble | June 4, 1946 |
| 2,633,975 | Koerber | Apr. 7, 1953 |

FOREIGN PATENTS

| | | |
|---|---|---|
| 108,388 | Switzerland | Jan. 2, 1925 |